Dec. 24, 1940.  C. M. OSTERHELD  2,226,526
TANK HEATING UNIT
Filed July 17, 1939  3 Sheets-Sheet 1
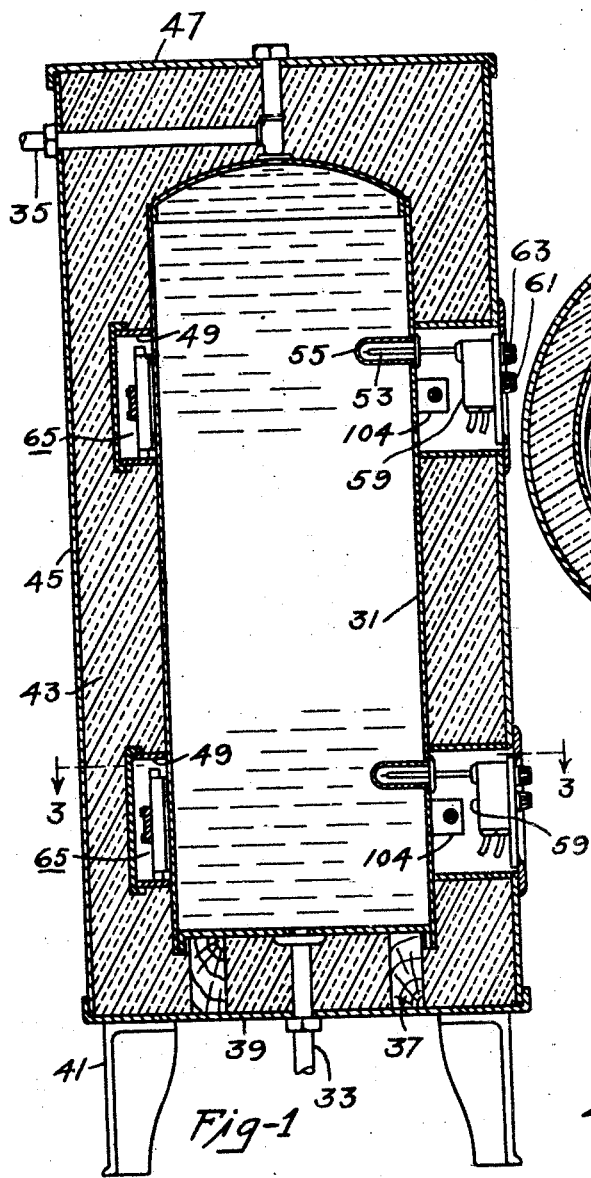
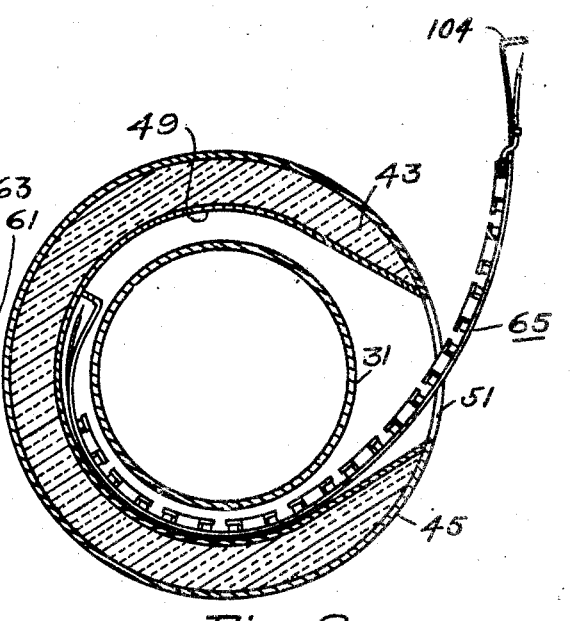
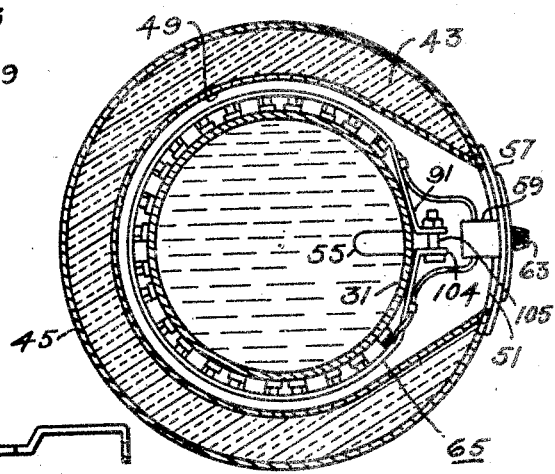
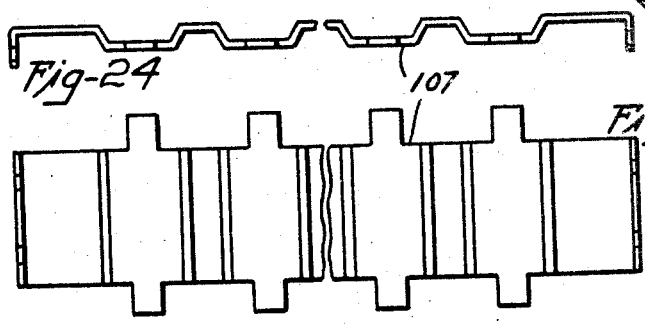
INVENTOR
CLARK M. OSTERHELD
BY
ATTORNEY

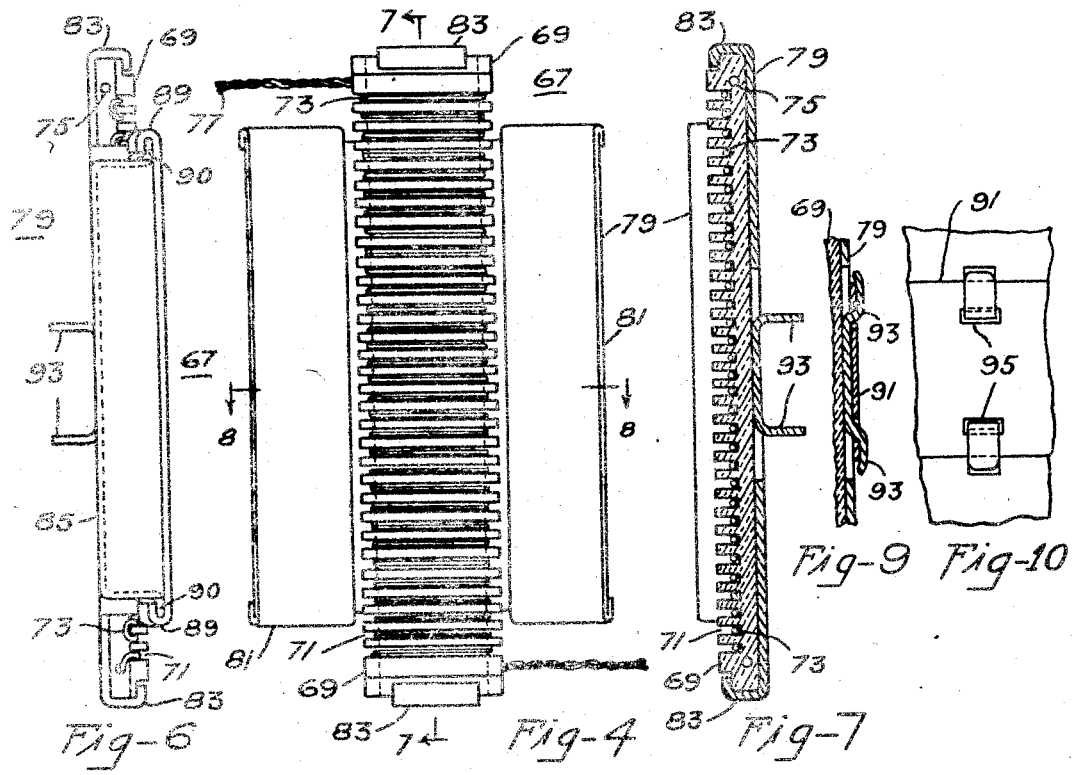
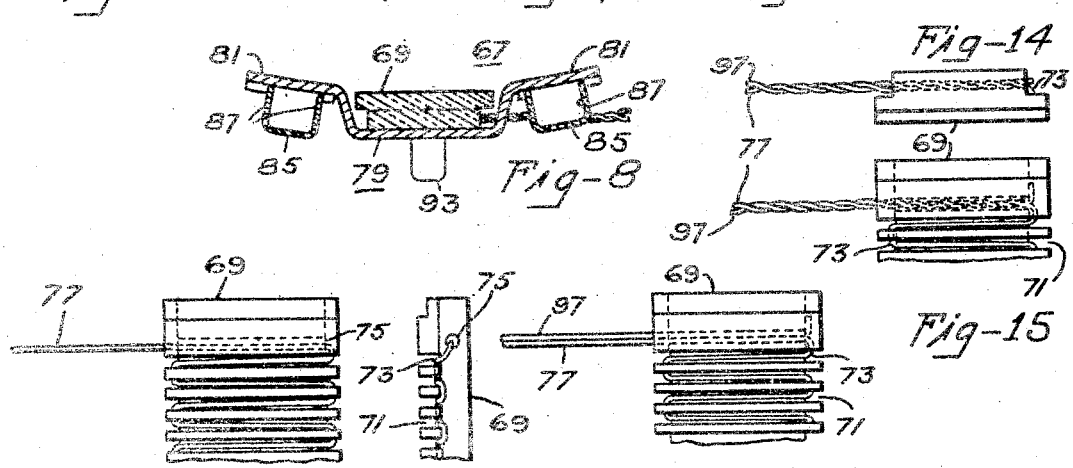

Dec. 24, 1940.   C. M. OSTERHELD   2,226,526
TANK HEATING UNIT
Filed July 17, 1939   3 Sheets-Sheet 3
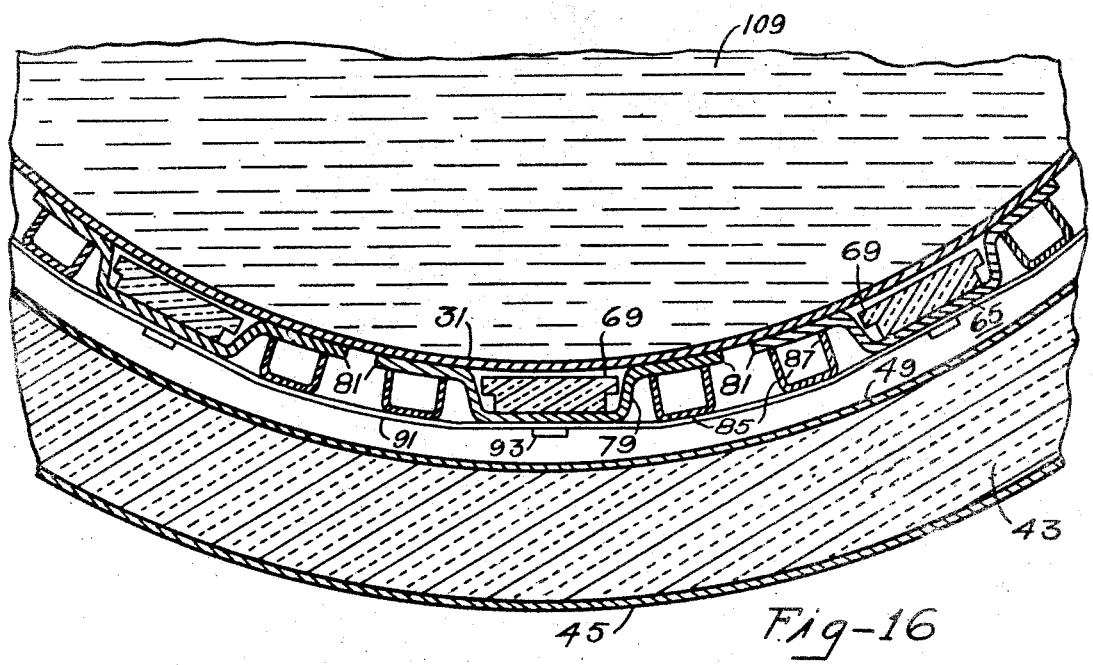
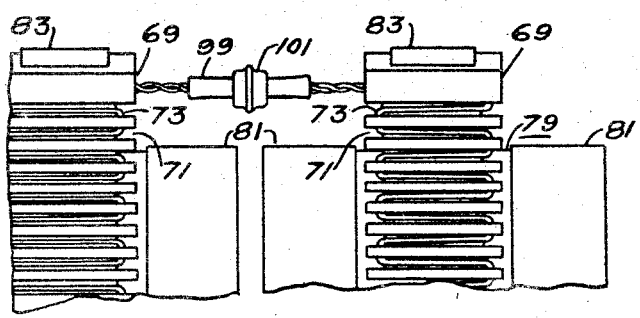
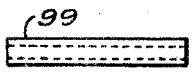
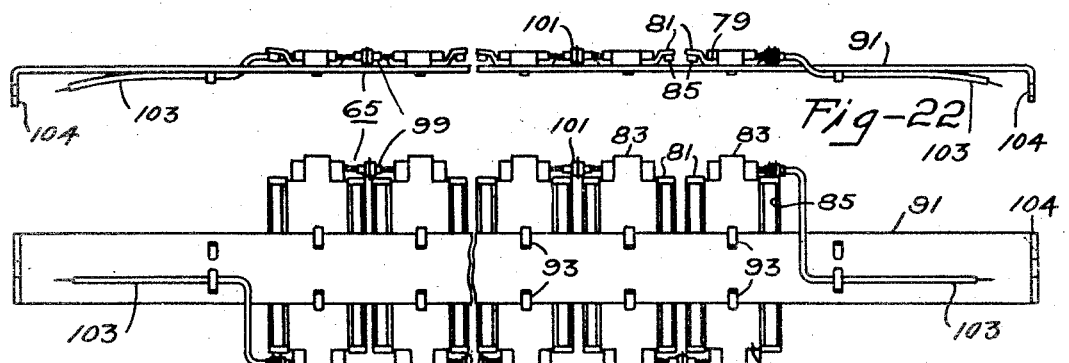
INVENTOR
CLARK M. OSTERHELD
BY
H. M. Biebel
ATTORNEY Patented Dec. 24, 1940

2,226,526

UNITED STATES PATENT OFFICE 2,226,526

TANK HEATING UNIT

Clark M. Osterheld, Stoughton, Wis.

Application July 17, 1939, Serial No. 284,881

16 Claims. (Cl. 219—39)

My invention relates to electric water heaters and particularly to electric heating units for mounting on the outside of a hot water tank.

One of the objects of my invention is to provide a relatively simple and highly efficient electric heating unit adapted for mounting on the outside of a water tank.

Another object of my invention is to provide a clamp-on electric heating unit comprising a plurality of individual elements, each including means for pressing it against the outside surface of a water tank.

Another object of my invention is to provide an electric heating element for mounting against the outside of a water tank, which element has means for effecting a water cooling of the back of the heating element.

Another object of my invention is to provide an electric heating element having means for making use of heat which would otherwise flow away from the tank and be wasted.

Other objects will either be apparent from a description of a preferred form of device embodying my invention or will be pointed out in the course of a description thereof and set forth in the appended claims.

In the drawings,

Figure 1 is a view in vertical section through a water tank having my improved electric heating unit mounted thereon, Fig. 2 is a horizontal sectional view therethrough showing the method of assembly or disassembly of the heater unit on a tank, Fig. 3 is a view of my improved electric heating unit shown mounted on the tank, taken on the line 3—3 of Fig. 1, Fig. 4 is a view in front elevation of a complete heating element, Fig. 5 is a top plan view thereof, Fig. 6 is a view in side elevation thereof, Fig. 7 is a longitudinal sectional view therethrough taken on the line 7—7 of Fig. 4.

Fig. 8 is a lateral cross sectional view therethrough taken on the line 8—8 of Fig. 4.

Fig. 9 is a fragmentary longitudinal sectional view showing the method of securing the band on the heating unit, Fig. 10 is a view in front elevation of the parts shown in Fig. 9, Fig. 11 is a view in front elevation of an end portion of the heating element.

Fig. 12 is a side elevational view of the parts shown in Fig. 11.

Fig. 13 is a view similar to Fig. 11 but showing the first step of reinforcing the resistor wire of a heating element, Fig. 14 is a fragmentary top plan view showing the reinforced end portions of the resistor, in final form, Fig. 15 is a view similar to Fig. 13 but showing the completed reinforced heating resistor end portion, Fig. 16 is a horizontal sectional view, on an enlarged scale, showing a tank, a part of the electric heating unit and of the heat insulating structure, Fig. 17 is a front elevational view of the connections between two adjacent heating elements, portions only thereof being shown, Fig. 18 is a view, in front elevation, of a refractory electric insulating thimble, Fig. 19 is a view in end elevation thereof, Fig. 20 is a view in front elevation of a tubular clamping member, Fig. 21, is a view in end elevation thereof, Fig. 22 is a top plan view of an assembled electric heating unit, Fig. 23 is a back view of the parts shown in Fig. 22, Fig. 24 is a top plan view of a modified form of unitary shroud and clamping band, and, Fig. 25 is a rear elevational view thereof.

Referring particularly to Figs. 1 to 3 inclusive of the drawings, I have there shown an ordinary domestic hot water tank 31 which may be provided with a cold water inlet 33 and a hot water outlet 35. The tank is preferably supported on heat-insulating blocks 37 which rest upon a bottom plate 39 supported by a plurality of suitable legs 41. The tank 31 is heat insulated by a layer 43 of any suitable heat insulating material now well known in the art and the assembly is provided further with an outer casing 45 preferably of metal and a cover 47, all of which cooperate to properly hold the heat insulating material, such as mineral wool, in its proper position around the tank.

I provide further a plurality of tunnels 49 around the tank and while I have shown a plurality of such tunnels, I do not desire to be limited thereto as in certain cases a single such tunnel may be sufficient for the purposes of housing a single flexible band-like heating unit adapted to be clamped around the outside of the tank. Each of these tunnels 49 comprises a structure of generally channel shape in lateral section open toward the tank. A structure of this kind is shown in Patent No. 2,101,691 issued December 7, 1937 to F. W. Scharf and assigned to the McGraw Electric Company. As shown particularly in Figs. 2 and 3 of the drawings, each tunnel is provided with an opening 51 at one point of its circumference, which opening is provided to permit of the flexible heating unit, to be hereinafter described in detail, to be easily placed in proper operative position in the tunnel and clamped against the tank or to be removed therefrom in case of necessity.

I have indicated generally a plurality of thermostatic control means 53 which may be mounted in a tube 55 which tube is open at its outer end and is so secured to the tank as to be water tight therewith. Each opening 51 is provided with a cover 57 on which cover may be mounted a control box 59 cooperating with the thermostat 53 to properly control the energization of the heating unit located in the tunnel 49. The cover 59 is removably mounted in proper operative position over the opening 51 and may have a control switch knob 61 mounted thereon as well as a thermostat adjusting knob 63, all in a manner well known in the art.

The flexible electric heating unit assembly is designated by the numeral 65 and is shown more particularly in Figs. 22 and 23 of the drawings while a single heating element 67 is shown in Figs. 4 to 8 inclusive. Each electric heating element includes an elongated bar 69, of electric insulating material and of flattened T-shape, in lateral section, the front face of which is wider than the rear face as will be seen more particularly by reference to Fig. 8 of the drawings. The front face of each member 69 is provided with a plurality of lateral saw cuts or slots 71 and a resistor wire 73 is adapted to be located in these respective slots 71 and extend around the overhanging part of the wall between a pair of slots, as will be noted by reference to Figs. 11 to 13 inclusive. A lateral aperture 75 is provided adjacent each end of the refractory member 69 and an end portion 77 of the resistor wire is adapted to be threaded through the aperture 75.

Each electric heating element includes in addition to the refractory resistor-supporting bar 69, a shroud 79 which extends longitudinally of the bar 69 and is of generally channel shape, as will be seen particularly by reference to Figs. 5 and 8 of the drawings, relatively wide lateral flanges 81 being provided at each side of the central portion, which flanges are preferably integral with the central portion of the shroud 79. The central portion of each shroud 79 has longitudinal extensions 83 integral therewith which extensions are bent over against the refractory supporting bar 69, as will be seen more particularly by reference to Figs. 4, 6 and 7 of the drawings, in order to retain the member 69 in its proper operative position within the shroud 79.

It is desired that the longitudinally extending flanges 81 be maintained in close contacting engagement with the outside surface of the tank and for this purpose I provide elongated pressure members 85 which are preferably but not necessarily of channel shape in lateral section. I preferably make these pressure members 85 of thin sheet metal with the edges of the flanges 87 thereof held in engagement with the outer face of a flange 81 of the shroud by bent-over portions 89 of the shroud, extending over end portions 90 of the pressure member, as will be seen by reference to Fig. 6 of the drawings. I provide one of these pressure members for each flange of a shroud.

Means for clampingly holding a plurality of such electric heating elements 67 against the outer surface of a water or fluid tank may comprise a continuous band 91 of relatively thin flexible metal, this band having interfitting engagement with each shroud and particularly with the central portion thereof. This interfitting engagement is effected by providing punched-out portions 93, two on each shroud and by further providing apertures 95 in the band 91 spaced a suitable distance to receive the punched-out portions 93, which are then bent over against the band 91, as is seen particularly in Figs. 9 and 10 of the drawings. It will be noted that the interfitting engagement between the band 91 and each shroud is a relatively loose one whereby no initial strain is put upon the bent-over projections 93. I may, however, use a discontinuous or sectional band, if desired, the adjacent sections being pivotally connected to each other.

Means for connecting the ends of adjacent resistors 73 wound upon the resistor supports 69 may comprise an extra wire or auxiliary lead 97 (see Fig. 14) which is inserted in each aperture 75 and the end portion of the resistor 73 and the lead 97 are then twisted together, as is shown in Figs. 14 and 15 of the drawings, in order to increase the current-carrying capacity of these end portions, particularly at those points where they are not in operative engagement with the resistor support 69 but extend freely in the air between adjacent members 69. I further provide a tubular metal connector 99 (see Fig. 20) which is adapted to cover the overlapping end portions 73 and the auxiliary leads 97 and these tubular covers 99 are then slightly flattened by any suitable means, such as a pair of pliers or some other crimping or flattening tool, in order that the reinforced leads may have a relatively large area of surface contact with the inside surface of the individual tubular member 99 covering the overlapping end portions. Before the tube 99 is mounted in place, a thimble 101, of refractory electric-insulating material, is mounted on the central portion of the tubular member 99 so that engaging contact of the tube 99 with the outside surface of a tank may be effectively prevented.

Each electric heating unit including a plurality of the individual electric heating elements 67 hereinbefore described, may be provided with a pair of leads 103 which are adapted to extend to and connect with a control box 59 which is provided with suitable contact terminals to receive these ends 103 in a manner well known in the art.

The extreme end portions of the band 91 may be provided with portions 104 bent to extend substantially radially of the tank as may be seen by reference to Fig. 3 of the drawings and a tightening or clamping bolt 105 may be engaged with these end portions 104 to tightly clamp the heating unit in close operative engagement against the outside surface of the tank.

Reference to Fig. 16 of the drawings will show that when the bolt 105 has been tightened, the band 91 will press tightly against the pressure members 85 to force them against their respective flanges 81, particularly with a line contact and in fact with two such line contacts for each flange 81, these line contacts extending longitudinally of a flange 81. The depth of the central portion of each shroud 79 is such that the inner face of the refractory resistor supporting bar 69 is not necessarily in contacting engagement with the outer surface of the tank 39. This is for the reason that I desire to have no appreciable pressure applied to the resistor supporting bar 69 to force it against the tank since to do so might cause fracture thereof. It is desired, however, to provide a relatively large clamping pressure on the pressure members 85 to cause them to force the flanges 81 into close engaging contact with the outside of the tank 31, and this is done by proper design of the pressure members 85, especially their radial depth.

It is, of course, to be understood that any desired number of electric heating elements 67 may be mounted in spaced-apart relation on a band 91 but I have found it possible to use a relatively small number of such individual heating elements, this number being much smaller than it has been necessary to use in the flexible heating element disclosed and claimed in Patent No. 2,101,691 to which reference has hereinbefore been made.

Referring now to Figs. 24 and 25, I have there illustrated a modified form of unitary clamping band and flanged shroud 107. In this construction adjacent flanges of adjacent shroud portions are integral with each other and the continuous unitary shrouds and flanges are used as a clamping band. In all other respects this heating unit is the same as already hereinbefore described where individual shroud and flange portions are used. This continuous shroud and band is of substantially crenellated shape in longitudinal section, as shown in Fig. 24.

Numerous tests made with clamp-on heating units of the type disclosed herein have shown that the temperature of the outer part of a tunnel 49, which is preferably made of metal, is relatively low as compared to the temperature of the outer part of a tunnel shown in the above mentioned Pat. No. 2,101,691. I attribute this to the use of a relatively thin refractory resistor support 69, the use of a shroud 79 and particularly to the use of relatively wide flanges 81 connected with a shroud. The shroud may, for instance, be made of aluminum although I do not desire to be limited thereto, but I have used aluminum in a number of heating units of this kind and have obtained very good results therewith, attributable to the low thermal reluctance or high heat conductivity of aluminum.

I effect what may be termed a water-cooling of the outer or back surface of each refractory resistor support 69 since a plurality of flanges preferably but not necessarily integral with the central portion of each shroud are held in tightly engaging contact with the outer surface of the tank adjacent each refractory resistor supporting member in which bare resistor wire is positioned to radiate heat directly against a portion of the outer surface of a tank. It is, of course, well known that a part of the heat, which is generated in a heating elemen of this general kind, flows outwardly and is usually or ordinarily lost, in so far as any heating of the contents of a water tank is concerned. The shroud hereinbefore described provides an efficient means for cooling the back of a resistor supporting bar by the effect of water 109 (see Fig. 16) contained in a tank, so that the term "water cooling" of the back of the resistor supporting bar is a fairly apt and accurate description of the effect which I obtain by use of such a flanged shroud. It may be noted that the central portion of the shroud closely adjacent to the back of a refractory resistor supporting bar as well as the side portions adjacent to the side faces of the bar receive or catch the heat which flows in directions other than towards the tank and conduct this heat to portions of the surface of a water tank extending parallel to and longitudinally of the resistor supporting bar.

The effect of "water cooling" of the back of the heating elements has been to reduce greatly the temperature to which the insulation outside of the tunnels containing the heating elements is subjected, so that this temperature with my improved heating unit is only about one-half the temperature heretofore found to exist in the insulation when using the structure shown in Pat. No. 2,101,691. The temperature at the back of each heating element is also greatly reduced and in most cases this temperature is only on the order of 100° F. higher than the temperature of the water within the tank. Since the heating element is thus maintained at a relatively low temperature, the temperature of the resistor itself is reduced and the resistor therefore is operated under conditions resulting in longer life and greater safety.

It is obvious that while I have illustrated and described discontinuous as well as continuous shrouds for the respective heating elements, it is more desirable, everything considered, to use individual heating elements and shrouds, since such individual heating elements can be combined in various numbers for various sizes and diameters of water tanks and for various amounts of energy to be translated into heat, as applied to any given tank.

While I have illustrated and described specific embodiments of my invention I do not desire to be limited thereto since all modifications coming within the scope of the appended claims are to be considered as being covered thereby.

I claim as my invention:

1. In an electric heater for use on a water tank, an electric heating element adapted to be positioned adjacent to the outside of a water tank and comprising a flat bar of electric-insulating material, a resistor strand supported thereby in a single plane adjacent the inner surface of the bar and a metal shroud of flat box-like shape covering three of the faces of said flat bar and including relatively wide lateral flanges at each side of said shroud engaging the outside surface of the tank closely adjacent to the sides of said bar to conduct to the tank heat flowing outwardly away from the tank from said three faces of the bar and elongated members of U-shape in cross section engaging said flanges for pressing them into close heat-transmitting contact with the outside surface of the tank.

2. A device as set forth in claim 1 in which said elongated members of U-shape are supported by the flanges.

3. A device as set forth in claim 1 in which said elongated members of U-shape are supported on flanges by interfitting engagement therewith.

4. In an electric heater for use on a water tank, an electric heating element adapted to be positioned adjacent to the outside of a water tank and comprising an electric-insulating resistor support, a resistor thereon and a metal shroud of flat channel shape in cross section for receiving and supporting the resistor support and having at least one relatively wide lateral flange adapted to have flatwise engagement with the outside surface of the tank closely adjacent to the resistor support to conduct to the tank heat flowing from the outside surface of the resistor support to cause water in the tank to cool the back of the heating element and means for holding said heating element in proper operative position on the outer surface of the tank and for pressing said flange against the outside surface of the tank, said holding means applying a greater pressure to the flange than to the intermediate portion of the shroud.

5. In an electric heater adapted to be mounted on a water tank, an electric heating element adapted to be positioned adjacent to the outside of a water tank and comprising a narrow, thin flat bar of electric-insulating material, an uncovered resistor strand supported thereby adjacent the inner surface of the bar and a metal shroud of flat box-like shape covering three of the faces of said flat bar and including relatively wide lateral flanges at each side of said shroud engaging the outside surface of the tank closely adjacent to the sides of the bar to conduct to the tank heat flowing outwardly away from the tank from said three faces of the bar, elongated pressure members engaging said flanges for pressing them into close heat-transmitting contact with the outside surface of the tank and band-like means engaging said shroud and holding said heating element in proper operative position against the outer surface of the tank and engaging said elongated pressure members to cause them to press the flanges into close heat-transmitting contact with the outside surface of the tank.

6. An electric heater adapted to be mounted against the outer surface of a water tank and comprising a plurality of peripherally spaced relatively shallow metallic members of channel-shape in lateral section with relatively wide longitudinally-extending flanges, relatively thin flat bars of dielectric material in said metallic members to be supported thereby closely adjacent to the outer surface of the tank, resistors supported by said bars in close and direct heat-radiating relation to the outer surface of the tank, and flexible band-like clamping means engaging said metallic members and operatively engaging said flanges to press them into flat-surface engagement with the outer surface of the tank to provide a plurality of heat flow paths of low thermal reluctance from the back of each resistor-supporting bar to the outer surface of the tank.

7. An electric heater for mounting on a water tank comprising a plurality of heating elements peripherally spaced around the outside of the tank, each element including a relatively thin flat bar of dielectric material having slots therein in that face thereof adjacent the tank, a resistor in said slots positioned by integral parts of the bar closely adjacent and in open heat-radiating relation to, the outer surface of the tank and a metallic shroud of flat channel shape with longitudinally-extending relatively wide flanges, receiving and supporting said bar in the intermediate portion of the shroud, and flexible band-like clamping means extending around the tank outside of the plurality of heating elements supporting the shrouds and operatively engaging the flanges of the metallic shrouds to press them tightly into flat-surface engagement with the outer surface of the tank to provide heat flow paths of high thermal conductivity from the outer face of each bar to the tank and to support said electric heater adjacent to the tank.

8. In an electric heater for mounting on a water tank, an electric heating element including a thin flat bar of dielectric material having slots in that face thereof adjacent to the tank, a resistor in said slots in close and direct heat radiating relation to the outer surface of the tank, a metal shroud of substantially flat box-like shape and having an intermediate portion in direct engagement with the outer surface of said bar and relatively wide lateral flanges adapted to closely engage the outer surface of the tank adjacent to said flat bar to provide a thermal path of high heat conductivity between the back of the bar and the surface of the tank adjacent to the bar to cause water in the tank to cool the back of the heating element and means engaging the flanges of the shroud to press them against the outer surface of the tank with substantially uniform pressure longitudinally of each flange.

9. An electric heater for use on a water tank comprising a plurality of spaced relatively narrow and thin flat bars of dielectric material having slots in that face thereof adjacent to the tank, a resistor in said slots in close and direct heat-radiating relation to the outer surface of the tank, metal shrouds of flat box-like shape with relatively wide lateral flanges, having their intermediate portions in close heat-receiving relation against the outer surfaces of the bars and having their flanges in direct and close heat-transmitting relation against the outside surface of the tank, band-like clamping means engaging the intermediate portion of each shroud to support the same on the outside of a tank and means interposed between said band-like clamping means and the respective shroud flanges for causing said band-like clamping means to press said flanges into close engagement with the outside surface of the tank.

10. A device as set forth in claim 5 and including means on said flanges to hold said pressure members in proper operative position thereon.

11. An electric heater for mounting on a water tank comprising a plurality of spaced heating elements, each including a relatively thin flat bar of electric-insulating material, a bare resistor supported thereby adjacent the inner surface of the bar, a metal shroud of flat box-like shape covering three faces of said bar and having longitudinally-extending lateral flanges of appreciable width, a pressure member of U-shape having line contacts with a flange and held by the flange in proper operative position thereagainst and a flexible clamping band having interfitting engagement with the intermediate portion of each metal shroud and engaging the intermediate portion of each pressure member to press each flange against the outside surface of a tank and to hold the heating elements around a tank.

12. A device as set forth in claim 11 in which each shroud is provided with longitudinal end portions interfitting with the ends of a resistor-supporting bar.

13. A device as set forth in claim 11 in which the electrical connection between adjacent heating elements includes a tubular metal member covering overlapping end portions of the resistors, the end portions of each metal tube being flattened into compressing engagement with the resistor and an insulator on said tubular metal member to prevent contact with the outer surface of the tank.

14. An electric heater for mounting on a water tank comprising a plurality of spaced heating elements, each including a relatively thin flat bar of refractory electric-insulating material, a resistor supported by the bar in direct heat radiating relation to the outer surface of a tank, a metal band of substantially crenellated form in longitudinal section supporting the refractory bars and means engaging the end portions of the band to hold it closely around a tank and cause portions of the band between spaced heating elements to be pressed into close heat transferring relationship with the tank.

15. An electric heater for mounting on a water tank comprising a plurality of spaced heating elements, each including a relatively thin flat bar of refractory electric-insulating material, a resistor supported by the bar in direct heat radiating relation to the outer surface of a tank and a unitary means for holding said heating elements in proper operative position adjacent the outer surface of a tank and for conducting to the tank heat from the heating elements normally flowing in directions other than toward the tank, said unitary means comprising a continuous band of crenellated form in longitudinal section.

16. In an electric heater for mounting on a water tank, an electric heating element adapted to be positioned against the outside of a tank, metallic means in close heat-receiving relation with the heating element and in close large-area heat-transmitting relation to the tank closely adjacent to both sides of the heating element and providing relatively short heat flow paths of relatively low thermal reluctance for conducting to the tank heat generated in the heating element and normally flowing in directions other than toward the tank and a single means for pressing said metallic means into close and large-area heat-transmitting engagement with said tank and with said heating element.

CLARK M. OSTERHELD.